United States Patent
Tregre

[11] Patent Number: 6,006,464
[45] Date of Patent: Dec. 28, 1999

[54] REVERSIBLE NOISE-MAKING SLIP WEIGHT DEVICE FOR FISHING

[76] Inventor: Euclid Tregre, 128 St. John St., Luling, La. 70070

[21] Appl. No.: 09/137,575

[22] Filed: Aug. 21, 1998

Related U.S. Application Data

[60] Provisional application No. 60/056,773, Aug. 25, 1997.

[51] Int. Cl.⁶ .................................................. A01K 85/00
[52] U.S. Cl. ........................................................ 43/42.31
[58] Field of Search .................. 43/44.9, 44.91, 43/42.36, 42.31

[56] References Cited

U.S. PATENT DOCUMENTS

| | | | |
|---|---|---|---|
| 2,741,864 | 4/1956 | Shotton | 43/42.31 |
| 3,908,298 | 9/1975 | Strader | 43/42.31 |
| 3,935,660 | 2/1976 | Plew | 43/42.31 |
| 3,987,576 | 10/1976 | Strader | 43/42.31 |
| 4,008,539 | 2/1977 | Gardner | 43/42.31 |
| 4,969,287 | 11/1990 | Johnson | 43/42.31 |
| 4,995,189 | 2/1991 | Crihfield | 43/42.31 |
| 5,038,513 | 8/1991 | Hardin | 43/42.31 |
| 5,144,765 | 9/1992 | Keeton | 43/42.31 |
| 5,259,151 | 11/1993 | Wicht | 43/42.31 |
| 5,381,622 | 1/1995 | Tregre | 43/42.31 |
| 5,428,919 | 7/1995 | Enomoto | 43/42.31 |
| 5,551,185 | 9/1996 | Reed | 43/42.31 |
| 5,566,498 | 10/1996 | Itoh | 43/42.31 |
| 5,822,912 | 10/1998 | Kato et al. | 43/42.31 |
| 5,829,183 | 11/1998 | Guerin | 43/42.31 |

FOREIGN PATENT DOCUMENTS

| | | | |
|---|---|---|---|
| 2305932 | 4/1975 | France | 43/42.31 |
| 2335152 | 12/1975 | France | 43/42.31 |
| 16151 | 8/1906 | Norway | 43/42.32 |

*Primary Examiner*—Thomas Price
*Assistant Examiner*—Fredrick T. French, III
*Attorney, Agent, or Firm*—Garvey, Smith, Nehrbass & Doody LLC

[57] ABSTRACT

A sliding sinker includes a bore for mounting it on a fishing line and a pair of opposed shaped surfaces that extend in opposite directions, at least one of the surfaces being hemispherically shaped and the opposing surface being preferably conically shaped, wherein the body includes a pair of sections that are fit together with an interference fit and a third sleeve section that likewise fits each of the body sections with an interference fit, a rattle being placed over the sleeve for movement in between end portions of the sleeve whereby the rattle can strike either of the body half sections to create a high impact sound during use. Either of the differently shaped opposed end portions can be placed as the "leading" end so that a conical leading end can be used for weedy underwater situations and a hemispherical or elliptical leading end for rocky bottom situations.

18 Claims, 1 Drawing Sheet

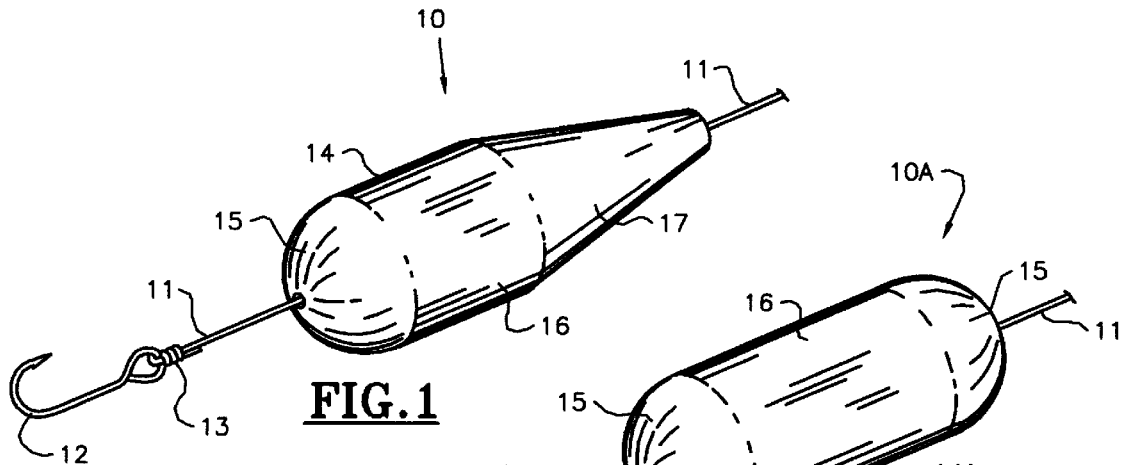
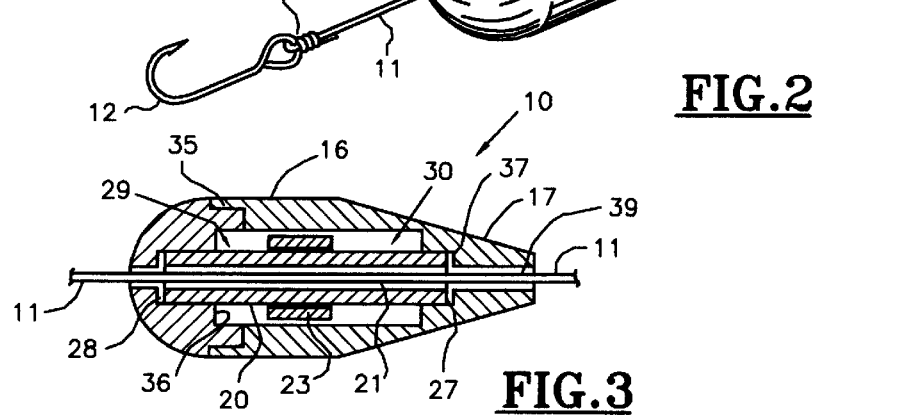
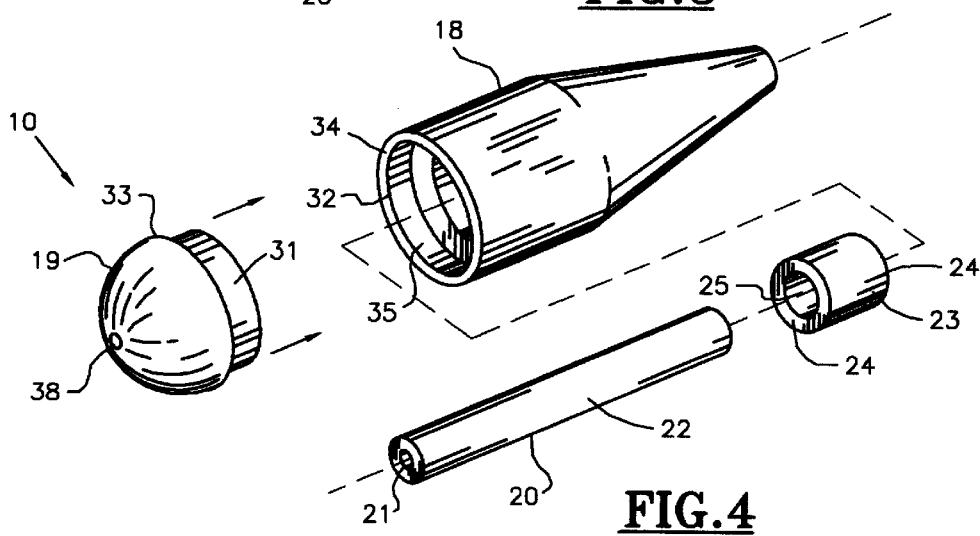

REVERSIBLE NOISE-MAKING SLIP WEIGHT DEVICE FOR FISHING

CROSS-REFERENCE TO RELATED APPLICATIONS

Priority of U.S. Provisional Patent Application Serial No. 60/056,773, filed Aug. 25, 1997, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fishing equipment, and more particularly to a sliding sinker with an internal rattle, and more particularly to an improved reversible configuration for a sliding-type sinker that includes an elliptically to hemispherically-shaped end portion and an opposed conically-shaped end portion.

BRIEF SUMMARY OF THE INVENTION

It has been generally known and accepted by experienced fishermen that rattling, noise making devices attract fish. The application of these types of devices in fishing has become a regular addition to an angler's arsenal of tackle and lures. This is especially true in fishing for black bass with artificial worms. In the use of artificial worms for black bass, several methods of rigging the fake worms are utilized. These include the "Texas" rig, split shotting, "doodling", and "Carolina" rigging to mention a few. The present invention utilizes the fish attracting lure of sound, (e.g., see Tregre U.S. Pat. No. 5,381,622) while incorporating the additional advantage of being reversible. The Enomoto U.S. Pat. No. 5,428,919 also disclosed a "sonic sinker" said to be an article of fishing tackle.

The design of the present invention is developed expressly for, and best utilized in "Carolina" type rigging and fishing with worms "Texas" style rigging. Generally, these methods are utilized in waters with weed growth or rocky bottoms. In weedy areas, one desireably utilizes a "bullet" (conical shaped) weight. In rocky bottom situations, one would desireably use an "egg" (elliptically shaped) or "ball" (spherical shaped) weight or a shape that is somewhat in between elliptical and hemispherical. The reasons for different styles is that the bullet weight moves readily through the grass with minimum hang-up, while the egg and ball weights are less prone to hanging in the cracks and crevices of rocky bottoms.

The present invention affords the angler the opportunity to address both grassy and rocky situations with one weight. The fisherman can rig his or her tackle with the conical end forward for grassy conditions or with the round end forward (elliptical to hemispherical) forward for rocky situations. This can also be economically prudent for the angler as one can purchase one style weight instead of two different styles.

What is provided is thus a reversible worm weight. The present invention discloses a worm weight of an advantageous and unique design utilizing a conical shape on one end and a rounded shape ranging from elliptical to hemispherical on the other end. Thus, it can be fished with either end forward as described earlier depending on the cover situation. The present invention retains and utilizes the advantageous noise making features of the Tregre U.S. Pat. No. 5,381,622 (incorporated herein by referenced) while improving the exterior so as to be advantageous over the common "bullet", "egg", or "ball" styles of weights.

The present invention (design) affords the angler the advantage of one weight that can be utilized to fish different situations simply by reversing its orientation on the line, either conical end forward or rounded end forward. The apparatus of the present invention could also be without a rattle. The material of choice is brass, but it could be make of steel, e.g., the ends could be substantially elliptical to substantially hemispherical.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a perspective view of a first embodiment of the apparatus of the present invention;

FIG. 2 is a perspective view of a second embodiment of the apparatus of the present invention;

FIG. 3 is a sectional view of the first embodiment of the apparatus of the present invention; and FIG. 4 is a perspective exploded view of the first embodiment of the apparatus of the present invention.

DETAILED DESCRIPTION OF THE INVENTION

FIGS. 1, 3, and 4 show the preferred embodiment of the apparatus of the present invention designated generally by the numeral 10. Sliding sinker apparatus 10 is preferably mounted during use on a fishing line such as the monofilament line 11 shown in FIGS. 1 and 3. A hook 12 is tied to the free end of line 11 at knot 13 as shown in FIG. 1. The sliding sinker 10 is mounted on line 11 and can slide freely along the line 11 above the hook 13. However, the sliding sinker 10 can be mounted in "Carolina Rig" style by being placed on a fishing line 11 above a swivel, leader, and hook. In the embodiments of FIGS. 1 and 3–4, sliding sinker 10 includes a body 14 that includes a hemispherically-shaped trailing section 15, a cylindrically-shaped mid section 16, and a conically-shaped lead section 17.

In alternate embodiment of FIG. 2 designated generally by the numeral 10A, there is provided a body 14A that has a cylindrical mid section 16 and two opposed hemispherical sections 15 as shown in FIG. 2.

In FIGS. 3 and 4, the construction of the body 14 is shown in more detail. Body 14 includes a first body section 18 and a second body section 19. The body section 18 is integrally formed to include the cylindrical section 16 and conical section 17. As shown in FIG. 3, the sections 18 and 19 fit together preferably with an interference fit between the various parts. A sleeve 20 has a hollow bore 21 that receives the fishing line 11 as shown in FIG. 3. The sleeve 20 fits into sockets 27 and 28 that are each cylindrically shaped. The socket 28 is formed in rear body section 19. The socket 27 is formed in front body section 18. The outer surface 22 of sleeve 20 is generally cylindrically shaped and is sized with respect to the sockets 27, 28 so that upon assembly, an interference fit is formed between each of the body sections 18, 19 and the sleeve 20. A rattle 23 is generally cylindrically shaped, having a bore 25 that is of an internal diameter larger than the external diameter of sleeve 20. In this fashion as shown in FIG. 3, the sleeve holds the rattle 23 in a position that enables it to slide back and forth along the sleeve and in between the body sections 18 and 19. The sleeve 23 can have flat or similarly shaped end portions 24 that form a clacking or rattling sound with correspondingly shaped transversely extending surfaces on the front and rear body sections 18, 19 respectively formed by cylindrically-shaped sockets. In FIG. 3, the surfaces that receive impact from rattle 23 include surfaces 36, 37. Arrow 26 in FIG. 2 indicates the back and forth movement of rattle 23 upon sleeve 20 so that it can strike either surface 36 or 37.

Upon assembly, a pair of cylindrical sockets 29 and 30 on rear body section 19 and front body section 18 respectively define a generally cylindrically-shaped chamber or void space that enables the rattle 23 to move in between the surfaces 36 and 37. Rear body section 19 includes an annular shoulder 31 that fits a cylindrically-shaped socket 32 on body section 18. Upon assembly of the body sections 18, 19, annular surface 33 registers against correspondingly sized and shaped annular surface 34 of body section 18. Shoulder 31 registers against and tightly fits annular surface 35 of body section 18 upon assembly as shown in FIGS. 3 and 4.

The embodiments 10 and 10A shown in the drawings enable a fisherman to provide a hemispherically-shaped leading or trailing edge during fishing that helps in fishing over rocky terrain. In FIG. 1, either the conical surface 17 or the hemispherical surface 15 can be faced away from hook 12 and in the direction of the fisherman depending upon conditions. Thus, the embodiment of FIG. 1 selectively provides a desired shape for desired fishing conditions to the leading edge of the sliding sinker 10. While in FIG. 1 the conical portion 17 is at the leading edge, it should be understood that the fisherman could just have easily reversed the sinker 10 and placed the hemispherical surface 15 away from the hook 12 and the conical surface 17 next to the hook 12. Generally speaking, the conical portion 17 is the leading edge for weedy conditions while the hemispherical surface 15 is the leading edge for rocky conditions.

The apparatus 10,10A can be manufactured of brass, stainless steel, or plastic. The apparatus 10, 10A can be used for bass fishing or for smaller saltwater fishing varieties such as speckled trout and redfish. The apparatus 10,10A can be used for bottom feeding fish such as catfish. The apparatus 10, 10A can be provided in weights of ½ ounces–1 ounce for example.

The following table lists the parts numbers and parts descriptions as used herein and in the drawings attached hereto.

PARTS LIST

| Part Number | Description |
| --- | --- |
| 10 | sliding sinker |
| 11 | line |
| 12 | hook |
| 13 | knot |
| 14 | body |
| 15 | hemispherical section |
| 16 | cylindrical mid-section |
| 17 | conical section |
| 18 | front body section |
| 19 | rear body section |
| 20 | sleeve |

-continued

PARTS LIST

| Part Number | Description |
| --- | --- |
| 21 | bore |
| 22 | outer surface |
| 23 | rattle |
| 24 | flat end |
| 25 | flat end\ |
| 26 | arrow |
| 27 | cylindrical socket |
| 28 | cylindrical socket |
| 29 | cylindrical socket |
| 30 | cylindrical socket |
| 31 | annular shoulder |
| 32 | cylindrical socket |
| 33 | annular surface |
| 34 | annular surface |
| 35 | annular surface |
| 36 | transverse surface |
| 37 | transverse surface |
| 38 | bore |
| 39 | bore |

The foregoing embodiments are presented by way of example only; the scope of the present invention is to be limited only by the following claims.

I claim:

1. A sliding sinker for use with fishing line that includes an elongated line member with a hook attached thereto comprising:

a) a body having opposing end portions and an outer surface, said body having a hollowed interior defining a rattling chamber and first and second line openings communicating with said interior and that receive the fishing line therethrough, the body including a pair of sections that are assembled together with an interference fit, one of the body sections including an elliptically to hemispherically-shaped external surface;

b) the opposing end portions being shaped so that the body can be reversed on the fishing line in order to adjust to different fishing conditions;

c) the body having a bore for holding a sleeve;

d) a sleeve contained within the body at the bore, the sleeve having a central longitudinal bore through which the fishing line passes during use and a generally cylindrically-shaped external surface, said sleeve bore aligning with said first and second openings;

e) a rattle that has an internal bore, the rattle being sized and shaped to fit within the body interior and having an internal shape that fits the external surface of the sleeve so that the rattle can freely slide upon the sleeve and in between the end portions thereof;

e) each of the body sections having a socket, said sockets aligning upon assembly so that they define said rattling chamber that surrounds the sleeve; and f) wherein the end portions of the rattle are configured to cooperate with correspondingly-shaped surface on the two body sections to produce a high impact rattling sound when the rattle strikes either of said surfaces.

2. The sliding sinker apparatus of claim 1 wherein one of the end portions is conically shaped.

3. The sliding sinker apparatus of claim 1 wherein one of the end portions is hemispherically shaped and the other end portion is generally pointed.

4. The sliding sinker apparatus of claim 1 wherein one of the end portions is hemispherically shaped and the other end portion is generally conically shaped.

5. The sliding sinker apparatus of claim 1 wherein one of the end portions is tapered for fishing in weedy underwater conditions.

6. The sliding sinker apparatus of claim 1 wherein one of the end portions is rounded for fishing in rocky underwater conditions.

7. The sliding sinker apparatus of claim 1 wherein each of the end portions of the body has a socket that fits over an end portion of the sleeve.

8. The sliding sinker apparatus of claim 1 wherein each of the end portions of the body has a socket that fits over an end portion of the sleeve, and a connecting portion surrounding the socket, said respective connecting portions forming a connection between said body end portions upon assembly.

9. The sliding sinker apparatus of claim 8 wherein the connecting portions are correspondingly shaped interconnecting annular flange portions that are generally concentric with said sockets.

10. A sliding sinker for use with fishing line that includes an elongated line member with a hook attached thereto comprising:
   a) a body having opposing end portions and an outer surface with a bore that receives a length of fishing line therethrough, the body including a pair of sections that are assembled together with an interference fit, one of the sections including an elliptically to hemispherically-shaped external surface and a generally cylindrically-shaped mid section;
   b) the opposing end portions being of different shapes, permitting the body to be reversed on the fishing line in order to adjust to different fishing conditions;
   c) a sleeve that has a central longitudinal bore through which the fishing line passes during use and a generally cylindrically-shaped external surface;
   d) a cylindrically-shaped rattle that has an internal bore sized and shaped to fit the external surface of the sleeve so that the rattle can freely slide upon the sleeve and in between the end portions thereof;
   e) each of the body sections having a cylindrically-shaped socket, said sockets aligning upon assembly so that they define a generally cylindrically-shaped rattling chamber that surrounds the sleeve; and
   f) wherein the end portions of the rattle are configured to cooperate with correspondingly-shaped surfaces on the two body sections to produce a high impact rattling sound when the rattle strikes either of said surfaces.

11. The sliding sinker apparatus of claim 10 wherein one of the end portions is conically shaped.

12. The sliding sinker apparatus of claim 10 wherein one of the end portions is hemispherically shaped and the other end portion is generally pointed.

13. The sliding sinker apparatus of claim 10 wherein one of the end portions is hemispherically shaped and the other end portion is generally conically shaped.

14. The sliding sinker apparatus of claim 10 wherein one of the end portions is tapered for fishing in weedy underwater conditions.

15. The sliding sinker apparatus of claim 10 wherein one of the end portions is rounded for fishing in rocky underwater conditions.

16. The sliding sinker apparatus of claim 10 wherein each of the end portions of the body has a socket that fits over and end portion of the sleeve.

17. The sliding sinker apparatus of claim 10 wherein each of the end portions of the body has a socket that fits over an end portion of the sleeve, and a connecting portion surrounding the socket, said respective connecting portions forming a connection between said body end portions upon assembly.

18. The sliding sinker apparatus of claim 17 wherein the connecting portions are correspondingly shaped interconnecting annular flange portions that are generally concentric with said sockets.

* * * * *